(12) United States Patent
Muraleedhara et al.

(10) Patent No.: US 11,487,251 B2
(45) Date of Patent: Nov. 1, 2022

(54) CHAOTIC SYSTEM ANOMALY RESPONSE BY ARTIFICIAL INTELLIGENCE

(71) Applicant: Morgan Stanley Services Group Inc., New York, NY (US)

(72) Inventors: Kesavanand Muraleedhara, Jersey City, NJ (US); Ahmed Jedda, Montreal (CA); Paulo Pinto, London (GB)

(73) Assignee: Morgan Stanley Services Group Inc., New York, NY (US)

( * ) Notice: Subject to any disclaimer, the term of this patent is extended or adjusted under 35 U.S.C. 154(b) by 63 days.

(21) Appl. No.: 17/124,403

(22) Filed: Dec. 16, 2020

(65) Prior Publication Data

US 2021/0132554 A1    May 6, 2021

Related U.S. Application Data

(63) Continuation of application No. 16/264,671, filed on Jan. 31, 2019, now Pat. No. 10,901,375.

(51) Int. Cl.
*G05B 13/02* (2006.01)
*G05D 1/00* (2006.01)
*G06V 20/58* (2022.01)

(52) U.S. Cl.
CPC ....... *G05B 13/0275* (2013.01); *G05D 1/0055* (2013.01); *G05D 1/0088* (2013.01); *G05D 2201/0213* (2013.01); *G06V 20/58* (2022.01)

(58) Field of Classification Search
None
See application file for complete search history.

(56) References Cited

U.S. PATENT DOCUMENTS 8,621,618 B1 *  12/2013  Ramsey ............... G06F 21/316
                                                    713/153
8,751,414 B2 *   6/2014  Datta .................. G06F 11/0751
                                                    706/11

(Continued)

OTHER PUBLICATIONS

"Jumps in Financial Markets: A New Nonparametric Test and Jump Dynamics", Susanne Lee and Per Mykland, Oxford University Press, The Review of Financial Studies, vol. 21, No. 6, 2008.

(Continued)

*Primary Examiner* — Jason Lin
(74) *Attorney, Agent, or Firm* — Weitzman Law Offices, LLC

(57) ABSTRACT

A system for detecting and responding to an anomaly in a chaotic environment, comprising one or more autonomous agent devices and a central server comprising a processor and non-transitory memory. The memory stores instructions that cause the processor to receive a first set of sensor readings from one or more remote electronic sensors, during a first time window, the sensor readings recording pseudo-Brownian change in one or more variables in the chaotic environment; determine, based on the first set of sensor readings, an expected range of the one or more variables during a second time window after the first time w window; receive a second set of sensor readings from the one or more remote electronic sensors during the second time window recording change in the one or more variables: determine, based on the second set of sensor readings, that one variable of the one or more variables is not within the expected range; and cause the one or more autonomous agent devices to attempt to mitigate a potential harm indicated by the one variable being outside of the expected range.

18 Claims, 6 Drawing Sheets

(56) References Cited

U.S. PATENT DOCUMENTS

| | | | |
|---|---|---|---|
| 9,225,738 B1* | 12/2015 | Chiles | H04L 63/1425 |
| 10,269,257 B1 | 4/2019 | Gohl | |
| 10,469,327 B1 | 11/2019 | Velmurugan | |
| 10,599,155 B1 | 3/2020 | Konrardy | |
| 11,029,678 B2* | 6/2021 | von Sobbe | A61B 5/445 |
| 2006/0025897 A1 | 2/2006 | Shostak | |
| 2011/0133954 A1* | 6/2011 | Ooshima | G08G 1/096716 |
| | | | 340/905 |
| 2012/0317058 A1 | 12/2012 | Abhulimen | |
| 2014/0009307 A1* | 1/2014 | Bowers | G08G 1/166 |
| | | | 340/901 |
| 2014/0031956 A1 | 1/2014 | Siessman et al. | |
| 2015/0025917 A1 | 1/2015 | Stempora | |
| 2015/0284001 A1 | 10/2015 | Watanabe | |
| 2015/0344030 A1 | 12/2015 | Damerow | |
| 2016/0293133 A1 | 10/2016 | Dutt | |
| 2017/0154225 A1 | 6/2017 | Stein | |
| 2017/0210379 A1 | 7/2017 | Obata | |
| 2017/0217588 A1 | 8/2017 | Spinelli | |
| 2018/0012082 A1 | 1/2018 | Satazoda | |
| 2018/0075309 A1 | 3/2018 | Sathyanarayana | |
| 2018/0114067 A1 | 4/2018 | Kwon | |
| 2018/0164825 A1 | 6/2018 | Matus | |
| 2018/0232947 A1 | 8/2018 | Nehmadi | |
| 2018/0276376 A1 | 9/2018 | Lim | |
| 2018/0276485 A1 | 9/2018 | Heck | |
| 2018/0314253 A1 | 11/2018 | Mercep | |
| 2018/0314258 A1 | 11/2018 | Brew | |
| 2018/0337941 A1 | 11/2018 | Kraning et al. | |
| 2018/0341571 A1 | 11/2018 | Kislovskiy | |
| 2018/0365533 A1 | 12/2018 | Sathyanarayana | |
| 2019/0088148 A1 | 3/2019 | Jacobus | |
| 2019/0220014 A1 | 7/2019 | Bradley | |
| 2019/0342297 A1 | 11/2019 | Adjaoute | |

OTHER PUBLICATIONS

"Power and Bipower Variation with Stochastic Volatility and Jumps", Ole Barndorff-Nielsen and Neil Shepard, Journal of Financial Econometrics, vol. 2, issue 1, Jan. 1, 2004.

* cited by examiner

CHAOTIC SYSTEM ANOMALY RESPONSE BY ARTIFICIAL INTELLIGENCE

CROSS REFERENCE TO RELATED APPLICATION

This application is a continuation of U.S. patent application Ser. No. 16/264,671, filed on Jan. 31, 2019 and also titled "Chaotic System Anomaly Response By Artificial Intelligence", which is hereby incorporated by reference in full.

FIELD OF INVENTION

This application relates to artificial intelligence methods and systems, and more specifically, for methods and systems for an artificial intelligence to analyze sensor data from a chaotic environment and to affect that environment.

BACKGROUND

In 1827, Robert Brown discovered some of the first evidence of the molecular theory of matter by observing how pollen particles in water were pushed back and forth in an unpredictable manner by impacts with invisible water molecules bouncing off one another. As observation devices have improved in quality, it has been discovered that all fluids, despite being made up of individual molecules which travel in straight lines when unimpeded by collision with other molecules, are highly chaotic due to the presence of countless collisions constantly changing the momentums of those molecules.

Brownian motion, the nature of movement of an individual particle in this chaotic fluid system, has been extensively analyzed within the mathematical fields of statistical physics, applied physics, and topology. Further, a number of non-fluid systems have been found to or hypothesized to be modellable as if undergoing Brownian motion, such as the movement of stars within a galaxy, or the change of value of an investment asset in a marketplace.

SUMMARY OF THE INVENTION

Disclosed herein is an artificial-intelligence system for detecting and responding to an anomaly in a chaotic environment, comprising one or more autonomous agent devices and a central server comprising a processor and non-transitory memory. The memory stores instructions that, when executed by the processor, cause the processor to receive a first set of sensor readings from one or more remote electronic sensors, during a first time window, the sensor readings recording pseudo-Brownian change in one or more variables in the chaotic environment; determine, based on the first set of sensor readings, an expected range of the one or more variables during a second time window after the first time window; receive a second set of sensor readings from the one or more remote electronic sensors during the second time window recording change in the one or more variables; determine, based on the second set of sensor readings, that one variable of the one or more variables is not within the expected range (and thus, whether it is presumed to be so unlikely to be the result of pseudo-Brownian motion that it likely to be non-Brownian motion instead); and cause the one or more autonomous agent devices to attempt to mitigate a potential harm indicated by the one variable being outside of the expected range.

Further disclosed is an artificial-intelligence method for detecting and responding to an anomaly in a chaotic environment comprising receiving a first set of sensor readings from one or more remote electronic sensors, during a first time window, the sensor readings recording pseudo-Brownian change in one or more variables in the chaotic environment; determining, based on the first set of sensor readings, an expected range of the one or more variables during a second time window after the first time window; receiving a second set of sensor readings from the one or more remote electronic sensors during the second time window recording change in the one or more variables; determining, based on the second set of sensor readings, that one variable of the one or more variables is not within the expected range; and causing the one or more autonomous agent devices to attempt to mitigate a potential harm indicated by the one variable being outside of the expected range.

DETAILED DESCRIPTION

Figure 1:
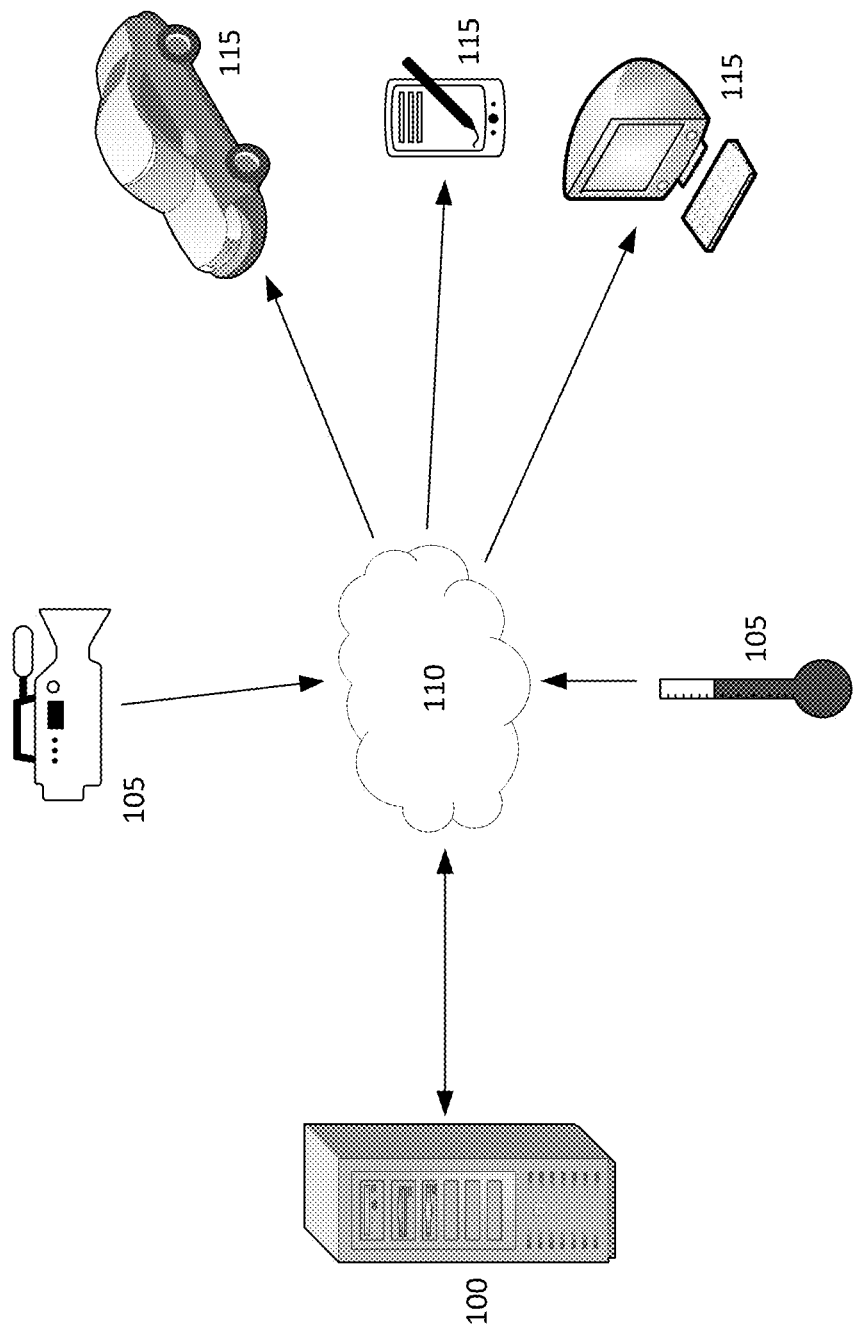
FIG. 1 depicts a computing system for receiving distributed sensor readings of a chaotic environment and directing agents in response to changes in the chaotic environment.

FIG. 1 depicts a computing system for receiving distributed sensor readings of a chaotic environment and directing agents in response to changes in the chaotic environment.

A chaotic system having a number of discrete "active" entities that influence each other or that influence "passive" entities within the system may be described as exhibiting pseudo-Brownian motion of those active or passive entities. The more simple the behavior of the entities being described, the more likely that the overall behavior of entities in the environment will match that of a true Brownian motion environment: the behavior of air or water currents may be better approximated than the behavior of birds in a flock, which may be better approximated than the behavior of humans in a crowd. The motion also need not be of a physical matter, as opposed to a value; for example, the number of data connections being maintained by a networking device may vary in response to users' independent behavior (each user's choice to initiate a connection) and users' dependent behavior (each user's choice to terminate a connection because of network congestion rendering the network useless). In this example, impatient and patient users entering and leaving the network at various times may be abstracted as if high- and low-velocity molecules jostling one another in a fluid, so that the network congestion level itself experiences pseudo-Brownian motion.

Turning now to the elements of FIG. 1, a central server 100 receives sensor data from a number of remote electronic sensors 105 in a chaotic environment via a network 110 and transmits instructions to a number of electronic computing device agents 115 via network 110.

Network 110 may be, for example, the Internet generally, a local wireless network, an ethernet network or other wired network, a satellite communication system, or any other means of connecting the sensors 105 to the central server 100 and the central server to the agents 115 to enable data transmissions. Moreover, network 110 may not be a single network, as pictured, rather than a number of separate networks: for example, a central server 100 could have a number of proximal sensors 105 to which it is attached by wired connections, a number of nearby sensors 105 to which it connects via a Wi-Fi network, and a number of extremely remote sensors 105 to which it connects via a satellite. Connections may avoid the use of a network entirely, and use direct wired or wireless transmission to send data to and from central server 100. As depicted in FIG. 1, arrows show the expected direction of data flow to and from the network.

Sensors 105 may be any types of electronic sensors that register data from a chaotic environment external to the central server 100. Example sensor types for particular embodiments may include, but are not limited to, cameras, thermometers, GPS tracking devices or other geolocation devices, sensors of motion/distance/acceleration/orientation, or communications modules receiving electronic data communications from a source.

Agents 115 may be any form of computing device able to cause a change in the chaotic environment, or able to cause a change in another "real world" system that is influenced by the chaotic environment. For example, an agent 115 could be a computing device that triggers a physical alarm, that pilots a drone aircraft or autonomous vehicle, that routes network traffic, that generates messages for display on physical devices associated with human users, or that performs other actions associated with "smart appliances" or other automated systems.

A number of possible pairings of sensors 105 and agents 115 to achieve particular purposes are described below.

In one example embodiment, sensors 105 may include thermometers at various locations internal to a computer or within a server room, and agents 115 may be climate control fans or air conditioners. A system may prevent physical damage to computers and improve computer performance by using the sensor data to determine whether upticks in observed temperature are likely to be random variations or substantive issues, such as a blocked fan grate or overheating component. In response to an issue, additional cooling systems may be activated or increased in power, automated alarms may be triggered, and human operators of a system may be notified of the unexpected change in temperature.

In another example embodiment, sensors 105 may be outdoor thermometers measuring temperature throughout a city or landscape. A system may prevent inaccurate weather reporting data by using data from the thermometers to determine that a change in observed temperature is not weather-related, but rather human-caused (such as operation of an exhaust fan for heated air near a thermometer, or the existence of a bonfire near a thermometer) and automatically notify a weather service that the data from particular sensors should be excluded or treated with caution.

In another example embodiment, sensors 105 may include GPS trackers on a number of animals, or cameras recording the locations of animals in a nature preserve. Aberrant behavior in the animals' movements may indicate the presence of poachers, environmental hazards, or unwanted predators in the nature preserve that are causing the animals to move in a manner different front a usual pattern of grazing and movement within a herd. Agents 115 may be aerial drones sent to observe the situation and report data back to park management, or personal devices or alarms used by park management to warn them that a human should be sent to investigate the situation.

In another example embodiment, sensors 105 may include GPS trackers in a number of automobiles. The flow of traffic may be modeled as a pseudo-Brownian motion of cars "bouncing off" one another by braking when they approach one another too closely, once a "drift" variable is included to normalize the calculations by subtracting the average speed of the flow of traffic during all calculations. Agents 115 may include automated systems for managing traffic (such as traffic lights or additional traffic lanes that may be opened or closed), autonomous vehicles themselves, or personal devices or alarms used by drivers, police, or other first responders. In response to a traffic jam, road hazard, unexpected traffic volume, or other issue influencing a natural flow of traffic, various automated systems may be directed to change behavior in a way that reduces impedance of traffic, and human actors may be alerted to the issue to inform their choices as well.

In another example embodiment, sensors 105 may include one or more cameras tracking the locations of a number of people in a public space, like a shopping center. Agents 115 may include a fire alarm or other alarm system, a cleaning robot, or a computer system capable of generating messages to direct human workers. Behavior of people that diverges significantly from "milling about" or from heading in a general direction while avoiding contact with other people may indicate a passive hazard, such as a liquid spill or noxious smell that is influencing people to take a longer path to avoid the hazard, or an active danger such as a lire or person with a weapon, from whom people are fleeing. In response, the system may automatically attempt to determine the cause of the hazard, trigger an alarm if necessary, and direct automated or human resources to address the hazard.

In another example embodiment, sensors 105 may include firewalls or routers at the edge of a computer network, reporting an incoming number of network packets, while agents 115 may include servers in a server cluster, routers, or firewalls. A system may select the beginning of a denial of service (DDOS) attack by distinguishing an increase in network traffic from a natural variation in the incoming traffic, and either activate more servers to handle the attack or shut off an inflow of network traffic until the attack ceases.

Similarly, sensors 105 may report total usage of resources on a device, such as load on a CPU (central processing unit), network card, or memory. Agents 115 may include a kernel or operating system process for shutting down or throttling software that is using an excessive or increasing proportion of system resources, by determining that an uptick in resource usage is indicative of a program bug or malicious software design, rather than a natural variance during intended use of the software. The operating system process may then be able to respond by automatically terminating the software, throttling resources available to the software, sandboxing the software to isolate it from other system components, or generating a warning for a human user of the software.

In another example embodiment, sensors 105 may include trackers of network traffic flow to a particular resource, such as the page for a particular movie on a streaming service or the page for a particular product on an e-commerce site, while agents 115 may include servers within the streaming service or automated warehousing elements associated with the e-commerce website. A system may detect the beginning of a surge in popularity for the given resource or item (such as that triggered by a celebrity endorsement or other unexpected cultural or economic change), and begin directing a content delivery network to distribute an electronic resource more widely, or may direct automated warehousing elements to move an item's storage location to be more efficiently shipped from the warehouse.

In another example embodiment, sensors 105 may include devices at a stock exchange or other market reporting the current buy or sell prices of one or more assets. Agents 115 may include computing devices capable of transmitting buy or sell orders to the market, or firewall devices capable of preventing such computing devices from successfully transmitting a buy or sell order to the market. In response to a market anomaly, the ability of traders to trade may be automatically stopped by the computing devices themselves, or traders may be notified of the anomaly so they may proceed with greater caution.

Figure 2:
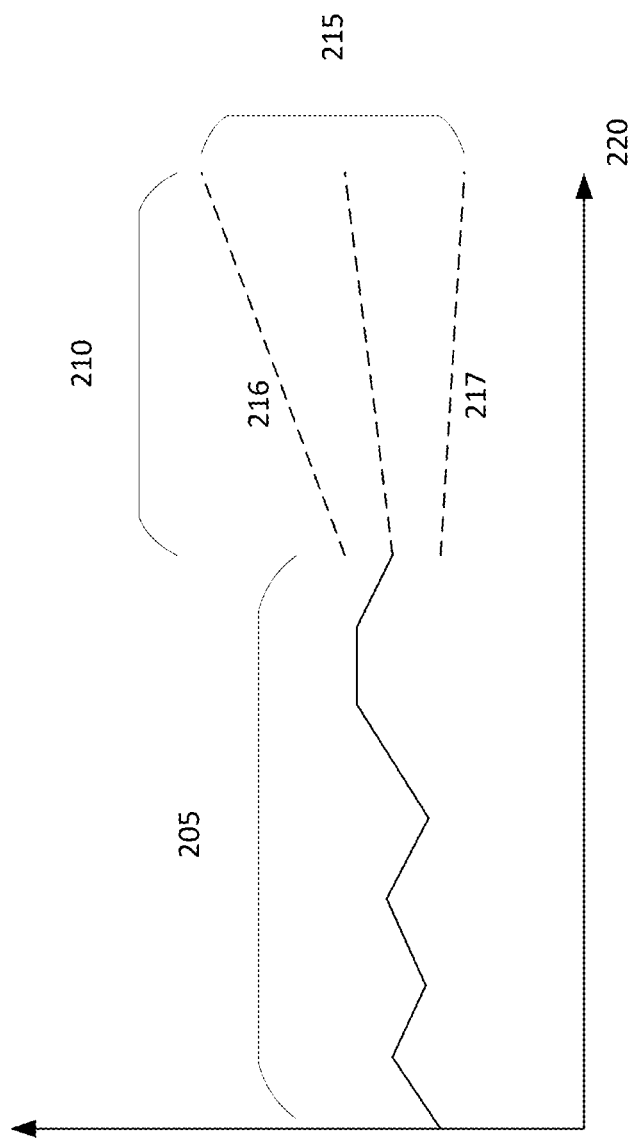
FIG. 2 depicts a possible projection of expected behavior in a chaotic system with pseudo-Brownian motion.
Figure 3:
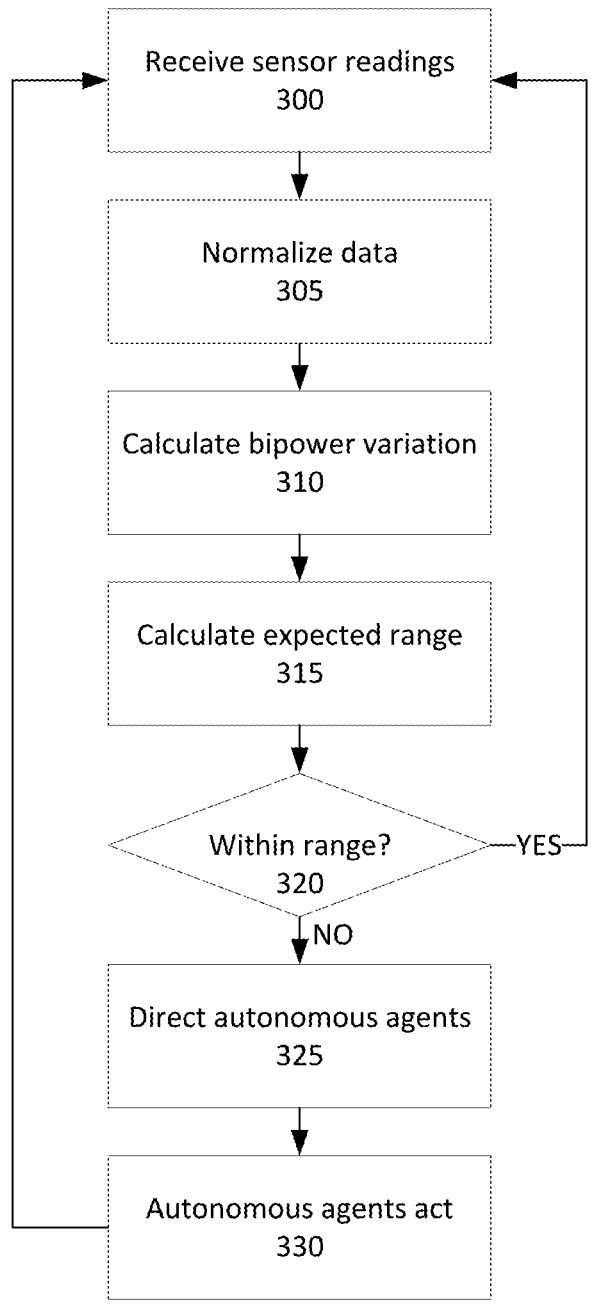
FIG. 3 depicts a method for an artificial intelligence system to process the incoming sensor data and direct the agents in the chaotic environment.

The determination that variations in observed sensor values indicate an issue that must be addressed by one of the agents 115 is made at least in part on observation of sensor values outside an expected range (as depicted in FIG. 2) determined by an artificial intelligence analysis of past and present sensor values (as depicted in FIG. 3 and described further below), FIG. 2 depicts a possible projection of expected behavior of a sensed value in a chaotic system with pseudo-Brownian motion.

The simplified graph of FIG. 2 shows observed historical sensor values 205 and predicted future sensor values 210. An expected range 215, including an upper range 216 and a lower range 217, bounds the predicted future sensor values 210, expanding over time (axis 220) as uncertainty increases due to the extra time available for the sensor values to randomly or pseudo-randomly change.

Figure 4:
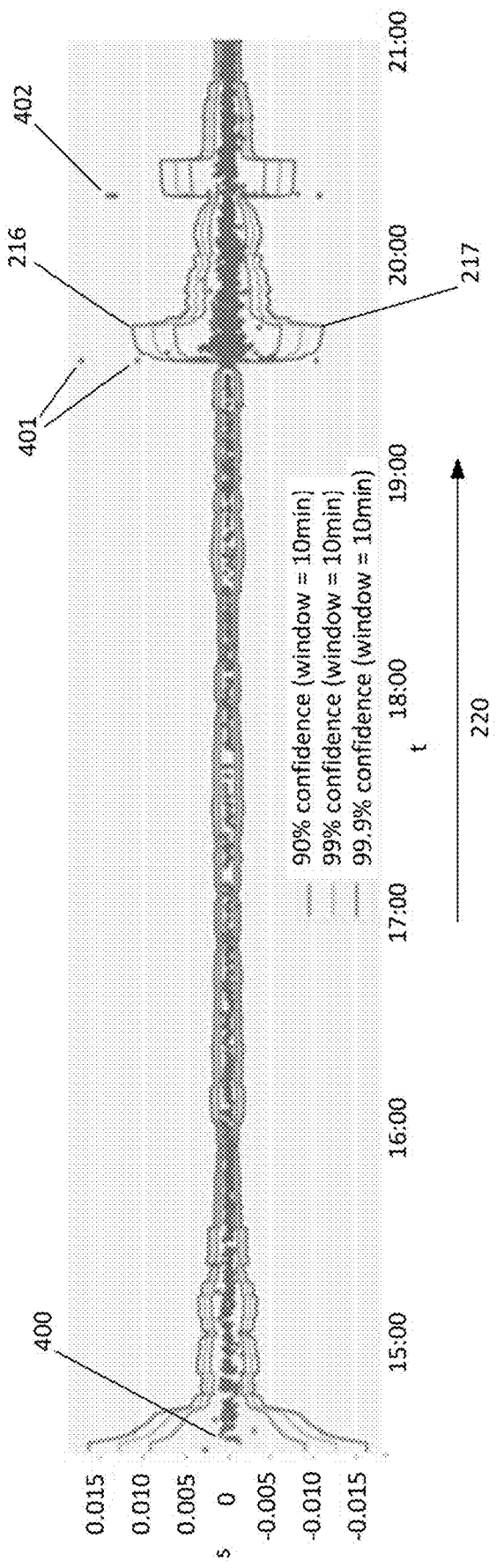
FIG. 4 depicts an actual graph showing sensor readings and changes in expected ranges over a period of lime as the expected ranges are repeatedly re-computed after conclusion of a new time window.

Expected range 215 represents a confidence interval such that, if changes to the sensor value are and remain driven by a pseudo-Brownian motion without active interference, the observed sensor values in the future are less likely to exceed the interval than some threshold value. For example, in one embodiment, a sensor value may be expected with 95% probability not to leave the expected range 215 without some unaccounted-for factor influencing the underlying chaotic environment being sensed by sensors 105. In another embodiment, the expected range 215 may be wider, and represent a 99%, or 99.9%, or even higher probability that sensor values will not leave the range without active interference. Examples of these varying confidence intervals are illustrated in FIG. 4, below.

As illustrated in FIG. 2, the observed and predicted sensor values 205 and 210 are single scalar values, so a cross-section perpendicular to every point along the time axis 220 of expected range 215 is a vertical line, and expected range 215 is essentially a two-dimensional wedge with a point at the present. In other embodiments, sensor values 205 and 210 may be multidimensional. For example, if two sensor values are measured in tandem, expected range 215 would be a three-dimensional pyramid or cone with its point at the present, having a cross-section with respect to time axis 220 that is two-dimensional and representing the expected range of possible pairs of the two sensor values. Higher-dimensional expected ranges for the values of multiple sensor values could be extrapolated (though not easily illustrated) based on the same principle.

Although the boundaries 216 and 217 of the expected range 215 are depicted here as straight lines, curves or other non-linear boundaries (or non-planar non-hyperplanar boundaries in higher dimension embodiments) may bound expected range 215, depending on characteristics of the chaotic environment or sensitivity of the system to an anomaly.

FIG. 3 depicts a method for an artificial intelligence system to process the incoming sensor data, generate the graph of FIG. 2 and direct the agents in the chaotic environment in response to subsequent sensor readings exiting the expected range.

At the beginning of each of a series of time windows, one or more sensor readings are received by the central server 100 from the sensors 105 (Step 300). The time windows may be tailored to a specific embodiment and represent any period of time from several minutes when measuring the movement of animals, to several seconds in measuring the temperature of a system or the movement of people, to minute fractions of a second when monitoring vehicle movements, network flow, resource usage, or fluctuations in asset price.

Any detected drill term (i.e., that all the sensor readings are experiencing a systemic shift in one direction, as may occur in some embodiments) is removed from the data (Step 305). For example, as mentioned above, the locations of vehicles in a traffic jam may change not only in response to one another and to hazards, but will also constantly be changing at about the average velocity of the traffic flow. As a result, sensor readings including the vehicles' overall velocity should be normalized by subtracting the drift term, the average traffic speed. After normalization, some vehicles will have negative velocities with respect to the flow and others positive, as one might expect from looking at the positive and negative velocities in a given direction of fluid particles within a container. Similarly, in an upward trending market subsequent to good economic news, a drift term may need to be isolated and removed in order to determine whether a particular asset price change is anomalous or in line with market trends.

Other actions may be taken to normalize data from sensor readings of different types or as otherwise needed in a given embodiment.

Then, looking at the normalized sensor readings from previous time windows, a bipower variation is calculated (Step 310) according to the equation $$\vec{\sigma^2} = \Sigma_{i \in \omega} |s(t_i)||s(t_{i-1})|$$

where s(t) is a sensor reading at time window t. Lowercase sigma represents a volatility estimator, an analogue to standard deviation in the sensor data calculated by the bipower variation.

Based on the calculated standard deviation and a desired risk tolerance for a particular application, an expected range is calculated for one or more coming time windows, given the assumption that a variable is undergoing pseudo-Brownian motion (Step 315). For example, a confidence interval of 90% that a variable is undergoing pseudo-Brownian motion is usually computed by determining a range of roughly to plus or minus four sigma from the mean sensor value, while a confidence interval of 99.9% may correspond roughly to plus or minus six sigma from the mean sensor value.

More specifically, a confidence interval that a variable's change is pseudo-Brownian rather than non-Brownian may be constructed by choosing L, a ratio of a sensor reading to sigma that should be considered a likely anomaly, such that P(anomaly)=exp(−exp((C(n)−L)/S(n))), where C(n) is a function equal to $((2 \log n)^{1.5}/c) - ((\log pi + \log \log n)/2c(2 \log n)^{0.5})$, n is the total number of windows and thus also the index of the current window, c is the constant sqrt(2/pi), and S(n) is a function equal to $1/c(2 \log n)^{0.5}$.

If each incoming sensor reading is within the confidence interval (Step 320), no action is taken save a return to receiving new sensor readings in a next time window and recalculating the expected range (repeating Steps 300-315). If an anomalous sensor reading is detected, central server 100 may generate a message for transmission to one or more of the autonomous agents 115 (Step 325), which may then further act as configured for harm minimization according to the application of the anomaly detection system (Step 330). Regardless of the actions of the autonomous agents 115, central server 100 continues to review sensor data to determine whether additional anomalies exist, or whether further sensor data seems to indicate a "new normal" for volatility in the chaotic system and subsequent adjustment of the expected ranges, as illustrated in FIG. 4.

FIG. 4 depicts an actual graph showing sensor readings and changes in expected ranges over a period of time as the expected ranges are repeatedly re-computed after conclusion of a new time window.

Expected maximum 216 and minimum 217 represent 99.9% confidence intervals that sensor readings, plotted with dots at 400, 401, 402 and elsewhere throughout FIG. 4 will fall within if influenced solely by pseudo-Brownian motion and not by an external, non-Brownian influence.

Rather than being linear as displayed in FIG. 2, the expected maximum and minimum 216 and 217 vary over time based on re-computation of past and present data, such that FIG. 4 effectively represents taking a small slice of every single projection occurring immediately after the present time in that projection. As variation in the sensor readings 400 increases or decreases during windows of time, the range between the expected maximum and minimum at those points in time accordingly widened and narrowed.

At two points in time (around the sensor readings 401 and 402), volatility in sensor readings 400 increased significantly, so much that the sensor readings 401 and 402 are above and three additional readings at around the same time are below the confidence intervals of 216 and 217, respectively. These outlier data points strongly indicate an active interference of some kind in the normal function of the chaotic environment and might be the basis of action by autonomous agents 115.

Both because the outliers might, however unlikely, be sensor readings not affected by a system anomaly, and because other later sensor readings may nonetheless be affected by the chaotic system interfered with, the confidence interval expands significantly after outliers 401 and 402 to prevent false alarms from subsequent sensor readings that may represent normal chaotic behavior after such a disturbance in the system.

Figure 5:
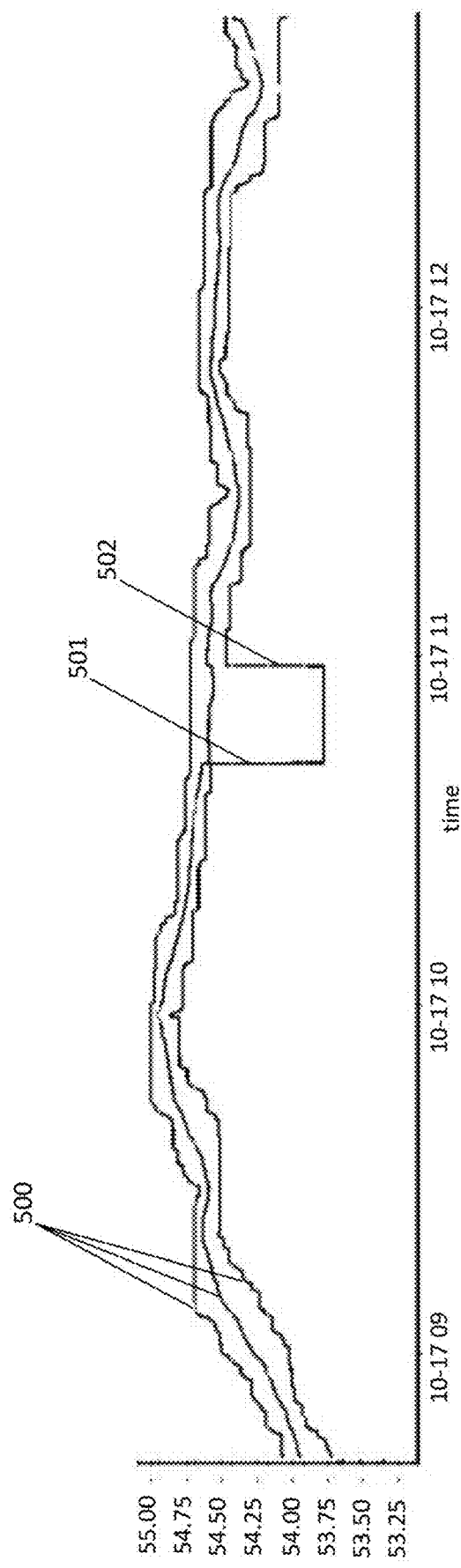
FIG. 5 depicts an actual graph showing sensor readings over a period of time as a variable experiences a sudden decrease and return to normalcy.

FIG. 5 depicts an actual graph showing sensor readings over a period of lime as a variable experiences a sudden decrease and return to normalcy.

Throughout most of a time period that three variables 500 are undergoing change, the L ratio remains below 4 at almost all times because the variables 500, while noisy, are not dramatically changing within any small time window. However, at time 501, there is a sudden and precipitous drop in one of the three variables, causing the L ratio to spike to approximately 10, which demonstrates a very high likelihood that the change was not another example of random noise or pseudo-Brownian motion in the variable's change. As a result, a system monitoring the changes of these variables should trigger and take automatic action as necessary.

At time 502, another sudden change occurs, causing the L ratio to increase even further, to a value of approximately 14. However, in this case, the system should not necessarily take action, despite the incredibly high L value, because the L value has been skewed by the period of a lower and more stable measured variable 500. The jump at time 502 likely represents a reversion to the mean and perhaps the end of an abnormal influence on the variable 500, not a new secondary influence further distorting it.

The decision by the system to take or refrain from automated action may be influenced not only by the statistical analysis of the incoming sensor data over a short time window, hut also on sensor data over long windows or on supplemental sensor data or information feeds that do not report the variable 500 values directly, but do report information that may influence it and may help to analyze whether a second disturbance in a variable's value is a reversion to the mean or not. Selection of a longer time window for data analysis may help to avoid the system overreacting to a sudden change and reversion/self-correction, but also runs the risk of making the system less responsive to changes that will not self-correct. Empirical testing with a given embodiment may help with determining a window size and number of successive windows to use to optimize the tradeoff between unnecessary action and undesired inaction.

Figure 6:
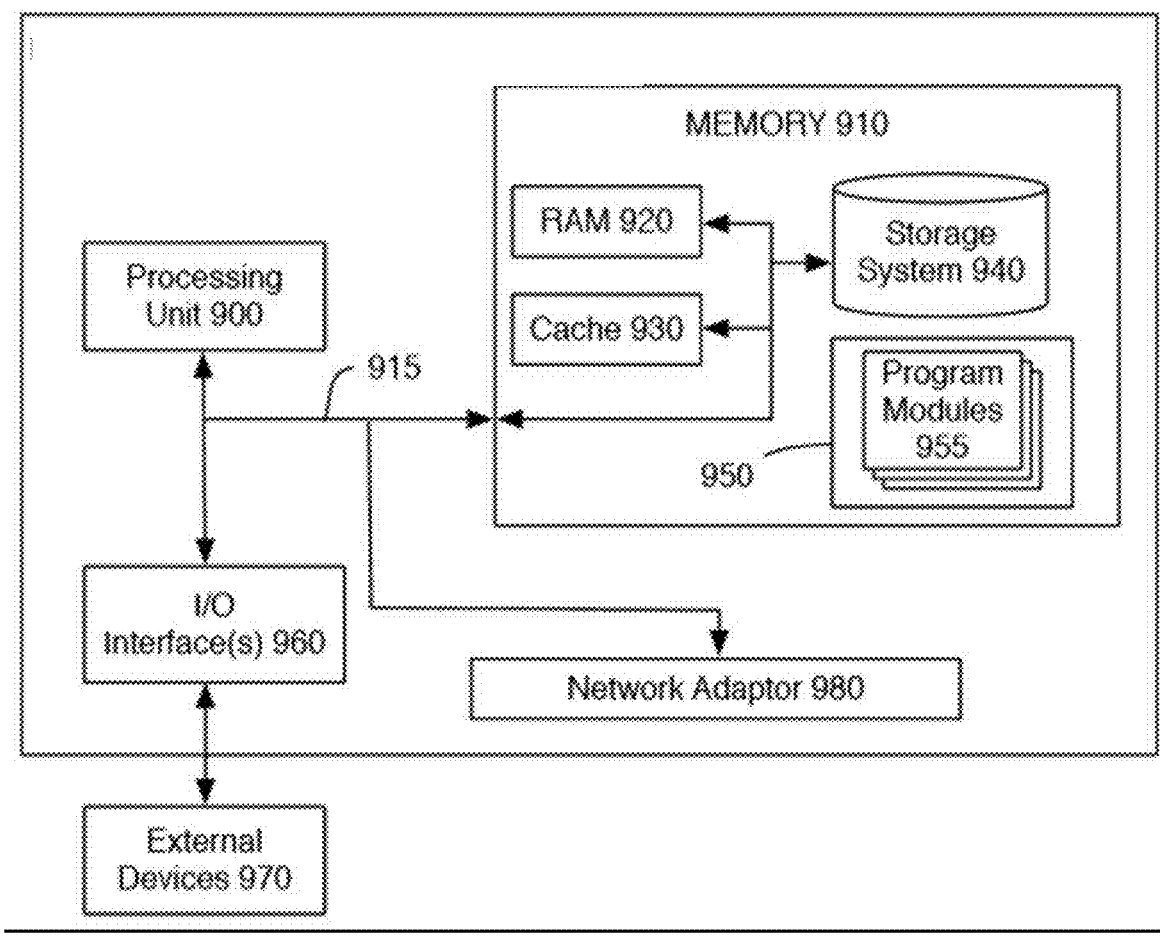
FIG. 6 depicts a general computing device for performing a number of features described above.

FIG. 6 is a high-level block diagram of a representative computing device that may be utilized to implement various features and processes described herein, for example, the functionality of central server 100, sensors 105, or autonomous agents 115. The computing device may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 6, the computing device is illustrated in the form of a special purpose computer system. The components of the computing device may include (but are not limited to) one or more processors or processing units 900, a system memory 910, and a bus 915 that couples various system components including memory 910 to processor 900.

Bus 915 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus. MicroChannel Architecture (MCA) bus. Enhanced ISA (EISA) bus. Video Electronics Standards Association (VESA) local bus, and Peripheral Component Interconnect (PCI) bus.

Processing unit(s) 900 may execute computer programs stored in memory 910. Any suitable programming language can be used to implement the routines of particular embodiments including C, C++, Java, assembly language, etc. Different programming techniques can be employed such as procedural or object oriented. The routines can execute on a single computing device or multiple computing devices. Further, multiple processors 900 may be used.

The computing device typically includes a variety of computer system readable media. Such media may be any available media that is accessible by the computing device, and it includes both volatile and non-volatile media, removable and non-removable media.

System memory 910 can include computer system readable media in the form of volatile memory, such as random access memory (RAM) 920 and/or cache memory 930. The computing device may further include other removable/non-removable, volatile/non-volatile computer system storage media. By way of example only, storage system 940 can be provided for reading from and writing to a non-removable, non-volatile magnetic media (not shown and typically referred to as a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 915 by one or more data media interfaces. As will be further depicted and described below, memory 910 may include at least one program product having a set (e.g., at least one) of program modules that are configured to carry out the functions of embodiments described in this disclosure.

Program/utility 950, having a set (at least one) of program modules 955, may be stored in memory 910 by way of example, and not limitation, as well as an operating system, one or more application software, other program modules, and program data. Each of the operating system, one or more application programs, other program modules, and program data or some combination thereof, may include an implementation of a networking environment.

The computing device may also communicate with one or more external devices 970 such as a keyboard, a pointing device, a display, etc., one or more devices that enable a user to interact with the computing device: and/or any devices (e.g., network card, modem, etc.) that enable the computing device to communicate with one or more other computing devices. Such communication can occur via Input/Output (I/O) interface(s) 960.

In addition, as described above, the computing device can communicate with one or more networks, such as a local area network (LAN), a general wide area network (WAN) and/or a public network (e.g., the Internet) via network adaptor 980. As depicted, network adaptor 980 communicates with other components of the computing device via bus 915. It should be understood that although not shown, other hardware and/or software components could be used in conjunction with the computing device. Examples include (but are not limited to) microcode, device drivers, redundant processing units, external disk drive arrays, RAID systems, tape drives, and data archival storage systems, etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing-processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk. C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions-acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed:

1. A system for proactively responding to an anomaly in a chaotic environment, comprising:
   a computing device in communication with a set of electronic sensors, the electronic sensors being configured to report one or more values in the chaotic environment that undergo pseudo-Brownian change during a first status of the chaotic environment and do not undergo pseudo-Brownian change during a second status of the chaotic environment, and the computing device comprising a processor, and non-transitory memory storing instructions that, when executed by the processor, cause the processor to:
   receive a first set of sensor readings during the first status;
   based on the first set of sensor readings, establish an expected range of the one or more values during a future time window;
   receive a second set of sensor readings comprising a value outside of the expected range;
   determine that the chaotic environment has entered the second status; and
   transmit, to one or more remote devices that interact with the chaotic environment, instructions to activate a physical appliance that acts upon the chaotic environment until sensor readings indicate that the chaotic environment has re-entered the first status.

2. The system of claim 1, wherein the expected range is determined based at least in part on a bipower variation calculated from the first set of sensor readings.

3. The system of claim 1, wherein the expected range is determined based at least in part on a predetermined probability such that future sensor readings of the one or more values will fall within the expected range at at least the predetermined probability in the absence of an active interference in the chaotic environment.

4. The system of claim 1, wherein the one or more remote devices act by preventing a network message from being transmitted through a network.

5. The system of claim 1, wherein the one or more remote devices act by generating a message for receipt by a human user.

6. The system of claim 1, wherein the one or more remote devices act by activating an alarm visible or audible to a human user.

7. The system of claim 1, wherein the instructions, when executed by the processor, further cause the processor to: expand the expected range based at least in part on the value outside the expected range.

8. The system of claim 1, wherein the instructions, when executed by the processor, further cause the processor to: narrow the expected range based at least in part on a third set of sensor readings indicating that the one or more values are within the expected range.

9. The system of claim 1, wherein the chaotic environment enters the second status in response to a computer malfunction transmitting messages that influence values within the chaotic environment.

10. A computer-implemented method for proactively responding to an anomaly in a chaotic environment, comprising:
   receiving a first set of sensor readings of one or more values in the chaotic environment from a set of electronic sensors during a first status of the chaotic environment, wherein the one or more values undergo pseudo-Brownian change during a first status of the chaotic environment and do not undergo pseudo-Brownian change during a second status of the chaotic environment;
   based on the first set of sensor readings, establishing an expected range of the one or more values during a future time window;
   receiving a second set of sensor readings comprising a value outside of the expected range;
   determining that the chaotic environment has entered the second status; and transmitting, to one or more remote devices that interact with the chaotic environment, instructions to activate a physical appliance that acts upon the chaotic environment until sensor readings indicate that the chaotic environment has re-entered the first status.

11. The method of claim 10, wherein the expected range is determined based at least in part on a bipower variation calculated from the first set of sensor readings.

12. The method of claim 10, wherein the expected range is determined based at least in part on a predetermined probability such that future sensor readings of the one or more values will fall within the expected range at at least the predetermined probability in the absence of an active interference in the chaotic environment.

13. The method of claim 10, wherein the one or more remote devices act by preventing a network message from being transmitted through a network.

14. The method of claim 10, wherein the one or more remote devices act by generating a message for receipt by a human user.

15. The method of claim 10, wherein, the one or more remote devices act by activating an alarm visible or audible to a human user.

16. The method of claim 10, further comprising: expanding the expected range based at least in part on the value outside the expected range.

17. The method of claim 10, further comprising: narrowing the expected range based at least in part on a third set of sensor readings indicating that the one or more values are within the expected range.

18. The method of claim 10, wherein the chaotic environment enters the second status in response to a computer malfunction transmitting messages that influence values within the chaotic environment.

* * * * *